United States Patent [19]

Murray, Jr. et al.

[11] Patent Number: 4,667,329

[45] Date of Patent: May 19, 1987

[54] DISKETTE SUBSYSTEM FAULT ISOLATION VIA VIDEO SUBSYSTEM LOOPBACK

[75] Inventors: Thomas L. Murray, Jr., Merrimack; James C. Siwik, Nashua, both of N.H.; Thomas O. Holtey, Newton, Mass.

[73] Assignee: Honeywell Information Systems Inc., Waltham, Mass.

[21] Appl. No.: 445,608

[22] Filed: Nov. 30, 1982

[51] Int. Cl.[4] .......................................... G01R 31/28
[52] U.S. Cl. ...................................... 371/24; 371/25; 371/27
[58] Field of Search ........ 364/184, 186, 200 MS File, 364/900 MS File; 371/18, 21, 20, 25, 22, 27, 53, 67, 68, 24, 16, 26, 28, 29, 34, 50, 57, 72

[56] References Cited

U.S. PATENT DOCUMENTS

| | | | |
|---|---|---|---|
| 3,518,413 | 6/1970 | Holtey | 371/16 |
| 3,566,093 | 2/1971 | Joyce et al. | 371/51 |
| 3,831,148 | 8/1974 | Greenwald et al. | 364/200 |
| 3,911,402 | 10/1975 | McLean et al. | 364/200 |
| 4,019,033 | 4/1977 | Parmet | 371/51 |
| 4,038,537 | 7/1977 | Cassarino, Jr. et al. | 371/51 |
| 4,048,481 | 9/1977 | Bailey, Jr. et al. | 371/16 |
| 4,103,338 | 7/1978 | Cizmic et al. | 364/900 |
| 4,148,098 | 4/1979 | McCreight et al. | 364/200 |
| 4,159,534 | 6/1979 | Getson, Jr. et al. | 364/200 |
| 4,268,905 | 5/1981 | Johann et al. | 364/200 |
| 4,327,408 | 4/1982 | Frissell et al. | 364/200 |
| 4,334,307 | 6/1982 | Bourgeois et al. | 371/16 |
| 4,524,444 | 6/1985 | Efron et al. | 371/24 |
| 4,569,049 | 2/1986 | McNamara | 371/25 |

OTHER PUBLICATIONS

T. H. Miller et al., "Programmable Loop-Back Read Diagnostic for Disk Drive", IBM Technical Disclosure Bulletin, vol. 14, No. 8, Jan. 1972, pp. 2272-2273.

Primary Examiner—Gareth D. Shaw
Assistant Examiner—Jonathan C. Fairbanks

[57] ABSTRACT

A data processing system includes a cathode ray tube (CRT) display subsystem and a floppy disk subsystem. The logic of both systems are verified by generating and transferring a fixed format stream of data bits from the CRT display subsystem to the floppy disk subsystem in modified frequency modulation (MFM) mode and checking the information received by the floppy disk subsystem against the original information presented to the CRT display subsystem.

5 Claims, 5 Drawing Figures

DATA PROCESSING SYSTEM 1

DATA PROCESSING SYSTEM 1

SHEET 3 of 3 ical test. This type of
DISKETTE SUBSYSTEM FAULT ISOLATION VIA VIDEO SUBSYSTEM LOOPBACK

RELATED APPLICATIONS

The following U.S. patent application filed on an even date with the instant application and assigned to the same assignee as the instant application is related to the instant application and is incorporated herein by reference.

"Firmware Simulation of Diskette Data Via a Video Signal" by James C. Siwik, Thomas L. Murray, Jr. and Thomas O. Holtey, having U.S. Ser. No. 445,608 and filed on Nov. 30, 1982.

BACKGROUND OF THE INVENTION

1. Field of the Invention

The present invention relates generally to data processing systems and more particularly to apparatus for performing diagnostic testing of a cathode ray tube subsystem and a floppy disk subsystem.

2. Description of the Prior Art

As the semiconductor industry induces more complex and higher speed logic elements, data processing systems designed using these elements perform more complex logic functions and have higher systems throughput than data processing systems designed in the past. Many of the data processing systems are made up of microprogram controlled subsystems coupled in common to a system bus. Diagnostic testing systems have been developed for such microprogrammed data processing systems to check out each of the subsystems coupled to the system bus from a central source. U.S. Pat. No. 4,159,534 entitled "Firmware/Hardware System for Testing Interface Logic of a Data Processing System" describes a typical diagnostic test. This type of diagnostic test unfortunately makes it difficult to isolate a particular error. It is possible that the error is caused by a malfunction of the central source: the system bus, a subsystem that was not addressed, or a subsystem that was addressed.

Microprogrammed subsystems are designed with the capability to perform diagnostic tests independently of the remainder of the data processing system to which the subsystems are coupled. U.S. Pat. No. 4,019,033 entitled "Control Store Checking System and Method" describes a diagnostic system which verifies that the parity logic associated with each register tested has valid parity. This type of diagnostic tests the parity of each register in turn which receives predetermined data. Also, the diagnostic does not force bad parity into the system to assure that the bad parity is detected.

U.S. Pat. No. 3,566,093 entitled "Diagnostic Method and Implementation for Data Processors" describes the use of the parity error signal in a diagnostic routine for signalling erroneous access to a memory location or to provide a distinctive synchronization signal for test equipment while the memory is aided through a loop including locations under test.

U.S. Pat. No. 3,518,413 entitled "Apparatus for Checking the Sequencing of a Data Processing System" describes a diagnostic system in which a count of a number of cycles for a microprogram to reach a particular state is compared with the actual count of the number of cycles it took to reach that state.

U.S. Pat. No. 3,831,148 entitled "Nonexecute Test Apparatus" describes self-testing of a processing system under microinstruction control using parity checking apparatus.

U.S. Pat. No. 4,048,481 entitled "Diagnostic Testing Apparatus and Method" describes apparatus which is operative to condition data recovery to receive blocks of synchronization and data patterns arranged in a predetermined format to simulate data transfer from a peripheral device.

U.S. Pat. No. 4,038,537 entitled "Apparatus for Verifying the Integrity of Information Stored in a Data Processing System Memory" describes apparatus for adding together a column of bits including a parity bit in each bit location of a memory having a plurality of word locations, and comparing each sum with a predetermined parity bit of a parity word in one of the word locations.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is a primary object of the invention to have an improved data processing system.

It is an object of the invention to have a data processing system with improved diagnostic verification technique.

It is another object of the invention to have one subsystem of the data processing system generate a stream of data bits for diagnostic verification of another subsystem of the data processing system.

SUMMARY OF THE INVENTION

A data processing system includes a microprocessor controlled by microprograms stored in a read only memory (ROM), a main random access memory (RAM), a cathode ray tube (CRT) subsystem, and a floppy disk subsystem.

The CRT subsystem, controlled by a CRT controller, includes a data RAM for storing data characters for display on the face of a CRT and an attribute RAM for storing codes representative of functions typically underlining, blinking, and inversion of the data characters or data fields displayed on the face of the CRT.

During normal operation, a character generator RAM stores dot patterns for each raster line for each data character displayed. The data character signals from the data RAM address the character generator RAM as well as the raster signals from the CRT controller to select a bit pattern which is read into a shift register which serializes the bit pattern for eventual display on the face of the CRT as alphabetic, numeric or graphics characters.

The floppy disk subsystem includes a floppy disk controller (FDC) which transfers data between a number of floppy disks and the microprocessor.

A "superpath" couples the CRT subsystem to the floppy disk subsystem under the control of a microprogram to the floppy disk subsystem to verify the logic of both subsystems. Also verified are the data and address paths between the microprocessor and both subsystems.

The "superpath" generates a superpath signal under microprogram control which steers a serial stream of data bits from the CRT subsystem to the floppy disk subsystem. The floppy disk subsystem is responsive to the data bit stream in a modified frequency modulation (MFM) mode wherein a binary data bit is represented by a cell containing a clock pulse, a data pulse, or no pulse. Also the data bit stream is recognized by the floppy disk subsystem as being in a fixed diskette track format.

For the superpath operation, the character generator RAM stores a hexadecimal 00 in a first address location, a hexadecimal 08 in a sixteenth address location, and a hexadecimal 80 in a thirty-second address location.

The data RAM is loaded with bytes in the fixed diskette track format. Each data RAM byte together with the raster select signals from the CRT controller is applied to the character generator RAM to read out either a hexadecimal 00, 08 or 80 to the shift register. Combinations of hexadecimal 00, 08 or 80 generate a stream of data bits in the MFM code. As an example, a clock cell could be represented by a hexadecimal 80 followed by six hexadecimal 00's. As a bit stream this would be a binary ONE followed by 55 binary ZERO bits. A data cell could be represented by three hexadecimal 00's, 08 and three hexadecimal 00's. A no pulse cell could be represented by seven hexadecimal 00's. The bytes stored in the data RAM would, when read out sequentially, result in a stream of bits from the serial register in MFM code which is recognized by the floppy disk subsystem as if it was read from the diskette of the floppy disk. The information received by the floppy disk subsystem is verified by the microprocessor against the information stored in the main memory RAM.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
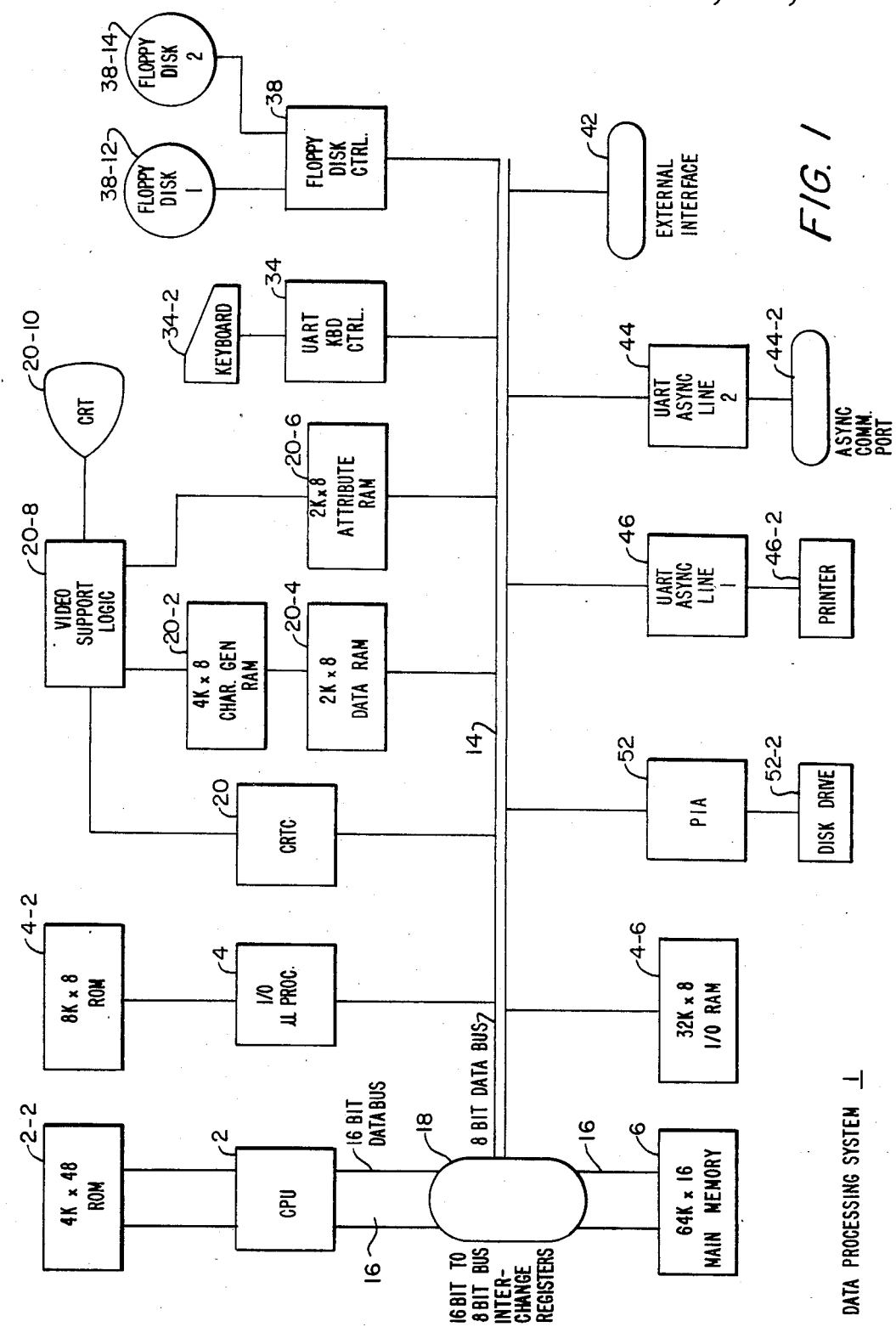
FIG. 1 is an overall block diagram of the system.

FIG. 1 is an overall diagram of a data processing system 1 which includes a firmware controlled central processor unit (CPU) 2 as an applications processor and a microprocessor 4 as an input/output processor.

Systems applications are performed by the CPU 2 executing software programs stored in a 64K by 16 bit word main memory 6. The microprograms used by the CPU 2 to execute the software instructions are stored in a 4K by 48 bit word read only memory 2-2.

Associated with microprocessor 4 are an 8K by 8 bit word read only memory (ROM) 4-2 and a 32K by 8 bit word random access memory (RAM) 4-6. The ROM 4-2 stores the firmware routines necessary for the start up and the initialization of the data processing system 1. The RAM 4-6 stores tables, communications control programs and firmware for emulating a universal asynchronous receive transmit controller (UART) 44, firmware for controlling a keyboard 34-2 by means of a UART 34, floppy disks by means of a floppy disk controller (FDC) 38, a printer 46-2 by means of a UART 46 and a cathode ray tube controller (CRTC) 20. The RAM 4-6 also includes a number of address locations, a "mailbox" which is used by the CPU 2 and microprocessor 4 to communicate with each other.

CPU 2 and main memory 6 transfer data between them over a 16 bit data bus 16 which is coupled to bus interchange registers 18. Also coupled to bus interchange registers 18 is an 8 bit data but 14. Bus interchange registers 18 receives 16 bit data from the data bus 16 for transfer over data bus 14 as two 8 bit bytes; and also receives 8 bit bytes from data bus 14 for transfer over data bus 16. The microprocessor 4, RAM 4-6, CRTC 20, UART's 34, 44 and 46, and FDC 38 are all coupled in common to data bus 14.

Also coupled to data bus 14 are a peripheral interface adapter 52 for controlling a disk device 52-2, an asynchronous line UART 44 for receiving and transmitting data characters via an asynchronous port 44-2 a 2K by 8 bit word data random access memory (RAM) 20-4 for storing characters for display on a CRT 20-10 and a 2K by 8 bit word attribute random access memory (RAM) 20-6 for storing attribute characters. Attribute characters are used typically for such CRT 20-10 display functions as underlining characters or character fields or causing certain selected characters or character fields to blink or be displayed with higher intensity. Character codes stored in RAM 20-4 are applied to a 4K by 8 bit word character generator random access memory (RAM) 20-2 which generates the codes representative of the raster lines of data which display the characters on the face of the CRT 20-10. A video support logic 20-8 is coupled to the CRTC 20, character generator RAM 20-2 and attribute RAM 20-6 for generating the lines of characters on the face of the CRT 20-10.

The FDC 38 is typically an NEC $\mu$PD765 single-/double density floppy disk controller described in the NED 1982 Catalog published by NEC Electronics USA Inc., Microcomputer Division, One Natick Executive Park, Natick, Mass. 01760.

The microprocessor 4 is typically a Motorola MC68B09 8 bit microprocessing unit. The PIA 52 is typically a Motorola MC68B21 peripheral interface adapter. The CRTC 20 is typcially a Motorola MC68B45 CRT controller.

The microprocessor 4, PIA 52 and CRTC 20 are described in the Motorola Microprocessor Data Manual, copyright 1981 by Motorola Semiconductor Products Inc., 3501 Bluestein Blvd., Austin, Tex. 78721.

The UART's 34, 44 and 46 are Signetics 2661 Universal Asynchronous Receive Transmit Controllers described in the Signetics MOS Microprocessor Data Manual, copyright 1982 by Signetics Corporation, 811 East Arques Avenue, Sunnyvale, Calif. 94086.

The superpath concept verifies the logic of the video and floppy disk subsystem by coupling the serial bit stream entering the video support logic 20-8 to the floppy disk controller 38.

Each character displayed on the screen of the CRT 20-10 is represented by a dot matrix area 9 dots wide by 12 dots high. The entire CRT 20-10 screen displays 25 rows of up to 80 characters per row.

The dot patterns for each character are stored in the character generator RAM 20-2 at 12 address locations of 8 bits per address location. Logic provides a 9th bit having the same binary value as the 8th bit per address location for proper character spacing on the display.

The data RAM 20-4 stores the codes for all of the characters displayed on the screen. The CRTC 20 continually addresses each of the address locations in the data RAM. The data bytes read from the data RAM 20-4 as well as the raster row bits from the CRTC 20 are applied to the address input terminals of the character generator RAM 20-2.

The display is written a row at a time during each raster scan. The character generator output signal read from the addressed character locations of the character generator RAM 20-2 are serialized and applied to the CRT 20-10 where they appear as a row of dots. The width in time of each dot position on the display is 59 nanoseconds. Twelve raster scans are required to generate each row of characters since a character area is 12 dots high.

The floppy disk subsystem uses a modified frequency modulation (MFM) code partitioned into cells of approximately 4 microseconds each. Each cell contains a data bit or a clock bit, or neither a data bit nor a clock bit. The following rules apply:
1. If the data bit is a binary ONE, then it is represented by a data pulse.
2. If the data is a binary ZERO following a cell that had a data pulse, then no pulse is written.
3. If the data is a binary ZERO following a cell that had no data pulse, then a clock pulse is written.

The 4 microsecond cell is divided into a clock and a data portion. A pulse appearing in the first 2 microseconds of a cell is a clock pulse and a pulse appearing in the last 2 microseconds of the cell is a data pulse. In MFM code, therefore, successive pulses may be 4, 6 or 8 microseconds apart.

An exception to the above rule 3 occurs when an address mark is written. In that case, the second of two consecutive clock pulses is omitted.

Superpath logic couples the serial data path from the CRT subsystem to the floppy disk subsystem. The CRTC 20 is conditioned by the firmware to generate 1 scan line per character row, i.e., generating the equivalent of 1 raster line of bits and not addressing the remaining 11 raster lines of a character row.

Since the width of a dot position is 59 nanoseconds, a 4 microsecond cell requires 67.8 dot positions. The byte in each address location of the data RAM 20-4 addresses the character generator RAM 20-2 which reads out eight bits. A ninth bit is generated and the nine bits are serialized and transferred to the FDC 38 over superpath. If 9 bit positions require one address word, 67.8 bit positions require 7.5 address locations in data RAM 20-4. Rounding off to 7 address locations of data RAM 20-4 calling for 63 bits (9×7) give a cell time of 3.72 microseconds (63×0.59 nanoseconds). Rounding off to 8 address locations calling for 72 bits (9×8) gives a cell time of 4.25 microseconds (72×0.59 nanoseconds). This allows the testing of the logic at speeds simulated to be above and below the nominal 4 microseconds per cell.

Each cell transmitted over superpath may have one of three states, a binary ONE bit at the left end indicating a clock pulse, a binary ONE bit at the middle of the cell indicating a data pulse, or all binary ZERO bits indicating no pulse. For a cell represented by the contents of 8 address locations in data RAM 20-4, a clock pulse transmitted over superpath is represented by a binary ONE followed by 71 binary ZERO bits and a data pulse transmitted over superpath is represented by 36 binary ZERO bits, a binary ONE followed by 35 binary ZERO bits. A no pulse cell transmitted over superpath is represented by 72 binary ZERO bits.

For a cell represented by the contents of 7 address locations in data RAM 20-4, a clock pulse transmitted over superpath is represented by a binary ONE followed by 62 binary ZERO bits, a data pulse transmitted over superpath is represented by 31 binary ZERO bits, a binary ONE bit followed by 31 binary ZERO bits. A no pulse cell transmitted over superpath is represented by 63 binary ZERO bits.

The information transmitted from the CRT subsystem to the floppy disk subsystems is in a fixed format which is verified when received by the FDC 38.

The floppy disk header information includes the following information in the order listed.
 (a) 12 bytes of no data (clock pulse only)
 (b) 3 bytes of address mark ($A1_{16}$)
 (c) 1 byte of sector identification ($FE_{16}$)

The address mark field information is followed by the address identifier field information.
 (d) 1 byte of track ID ($00_{16}$)
 (e) 1 byte of head select ($00_{16}$)
 (f) 1 byte of sector number ($07_{16}$)
 (g) 1 byte of sector size ($01_{16}$)
 (h) 2 bytes of cyclic redundancy check (CRC) ($50AA_{16}$)
 (i) 10 bytes of gap fillers ($4E_{16}$)

For the cell width of 4.25 microseconds, the data RAM 20-4 will store 2048 bytes. For the cell width of 3.72 microseconds, the data RAM 20-4 will store 1792 bytes.

(32 bytes×8 bits/bytes=8 bytes/bits=2048 bytes, and 32 bytes×8 bits/bytes×7 bytes/bits=1792 bytes)

Figure 2:
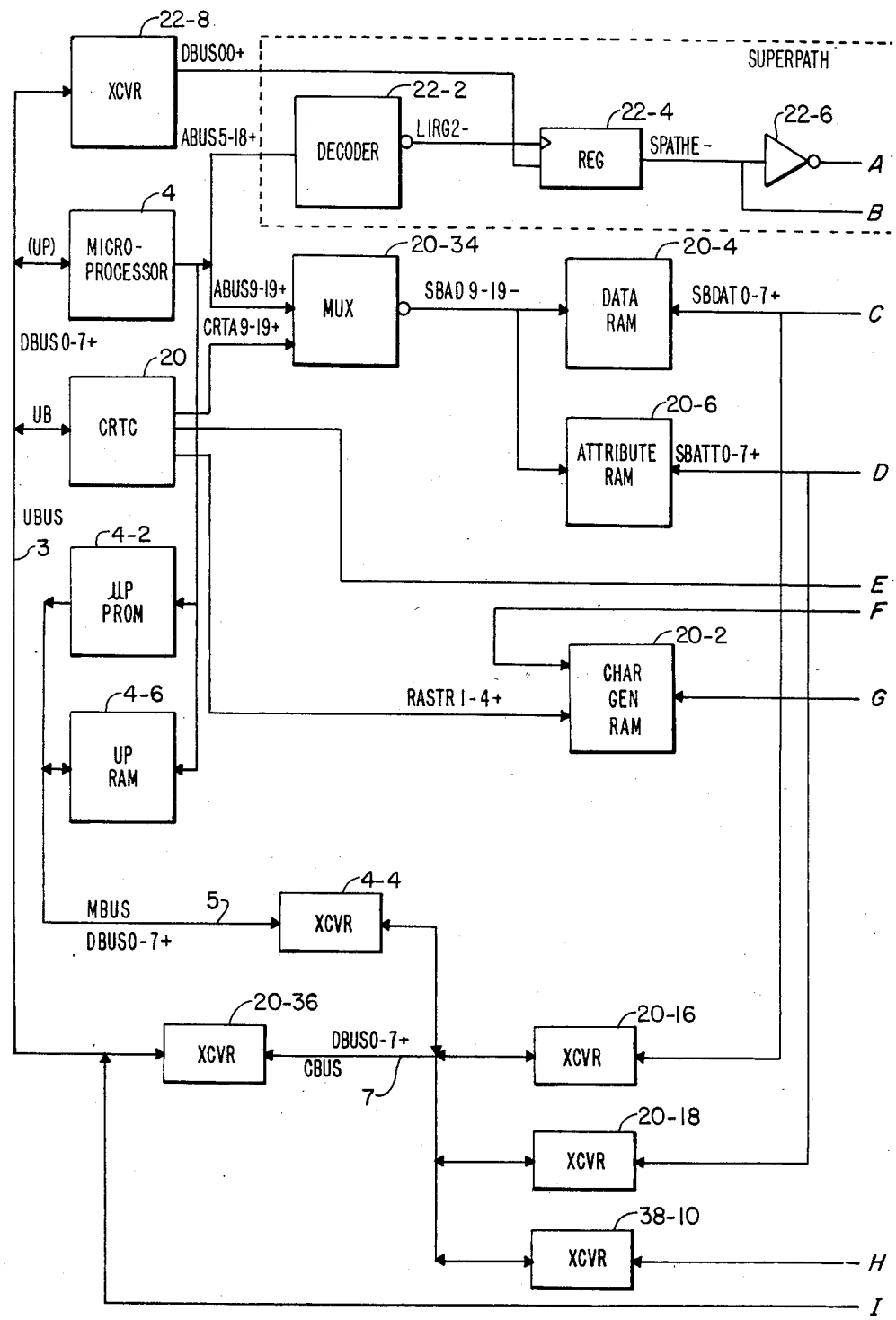
FIG. 2 is a block diagram of the CRT display and the floppy disk subsystems coupled by superpath.
Figure 2:
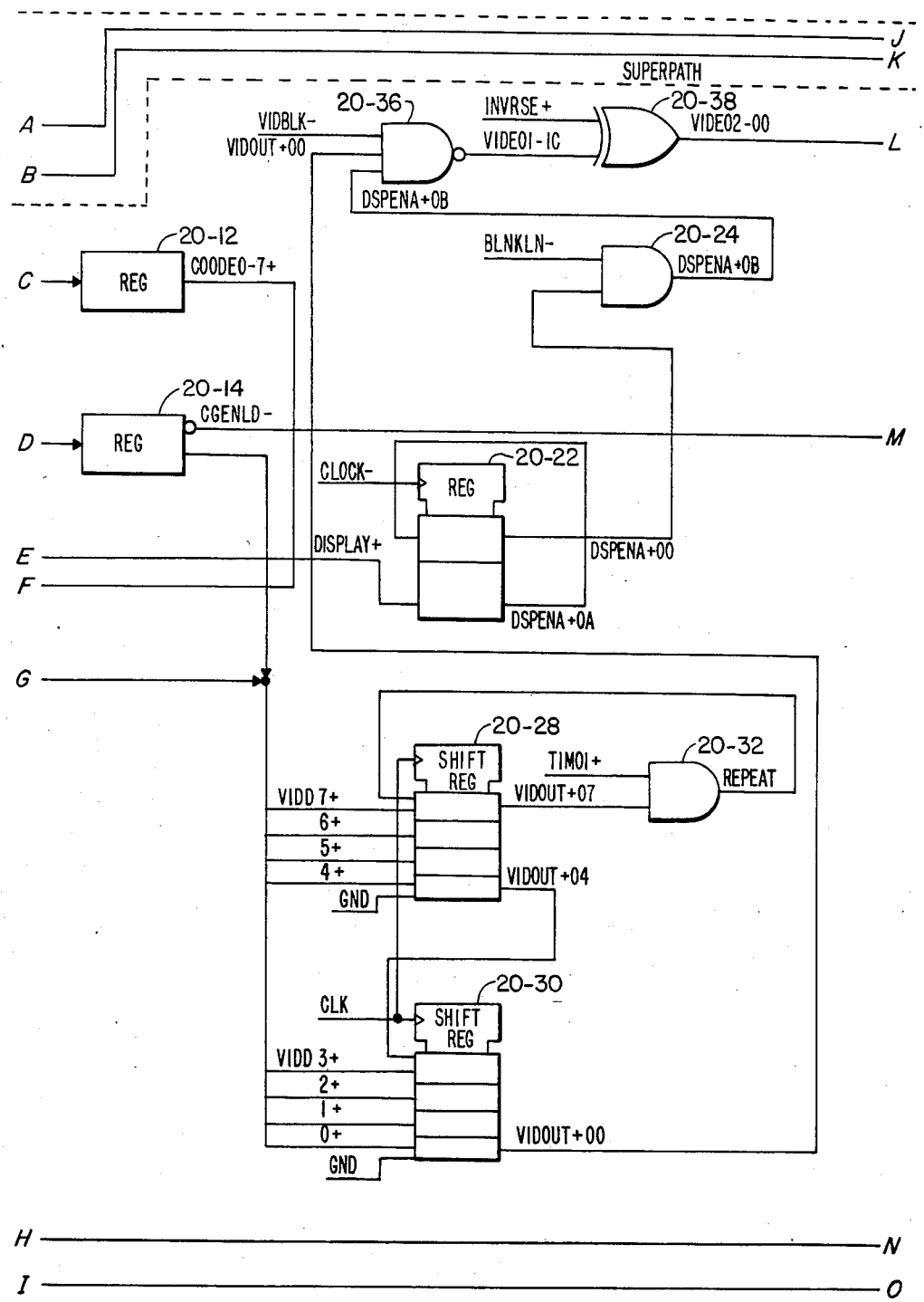
Figure 2:
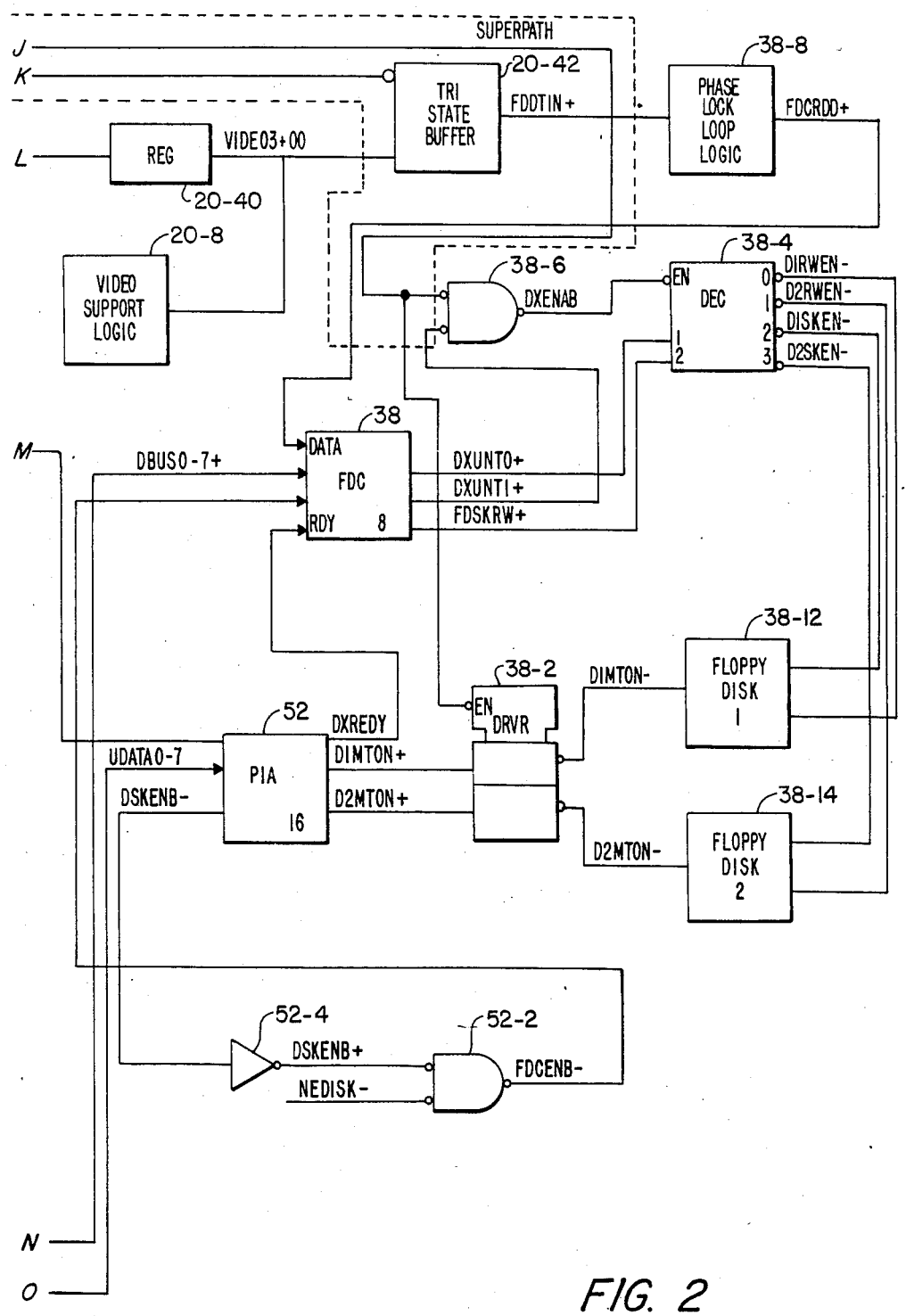

Referring to FIG. 2, superpath couples the CRT display system to the floppy disk subsystem by applying the eight data bit signals VIDD 0-7+ from character generator RAM 20-2 to shift registers 20-28 and 20-30, data bit stream signal VIDOUT+00 to a NAND gate 20-36, output signal VIDEO1−1C to an exclusive OR gate 20-38, output signal VIDEO2−00 to a register 20-40, output signal VIDEO3+00 to a tristate buffer 20-42, output signal FDDTIN+ to a phase lock loop logic 38-8, and output signal FDCRDD+ to the floppy disk controller 38. Phase lock loop logic 38-8 recovers the data bits from the bit stream by separating the clock pulse. A ninth data bit REPEAT having a logic value equal to signal VIDD 7+ is appended to the eight data bits to transfer 9 bit bytes over signal line VIDOUT+00 to provide the 9 dot wide character on the CRT 20-10 screen. This is accomplished by signal VIDOUT+07 being applied to an AND gate 20-32 to generate the REPEAT signal.

Superpath is activated by microprocessor 4 applying address signals ABUS 5-18 to a decoder 22-2 wherein address signals ABUS 6-12,15 are at logical ONE and address signals ABUS 5,13,14,16-18 are at logical ZERO. These address signals are generated under firmware control as described infra.

During normal operation under firmware control, the microprocessor 4 executes microinstructions received from the microprocessor PROM 4-2 in response to address signals ABUS 9-19+. The microinstruction signals DBUS 0-7+ are received by the microprocessor 4 from PROM 4-2 via M bus 5, a transceiver (XCVR) 4-4, CBUS 7, a XCVR 20-36 and UBUS 3.

The overall system timing is divided into a CPU cycle wherein the microprocessor 4 is operative with the display subsystem and a direct memory access (DMA) cycle wherein the CRTC 20 controls the display of characters on the CRT 20-10. The data RAM 20-4 and attribute RAM 20-6 are updated by the microprocessor 4 by address signals ABUS 9-19+ applied to a multiplexer 20-34. The output signals SBAD 9-19− address data RAM 20-4 and attribute RAM 20-6. The data byte signals DBUS 0-7+ from microprocessor 4 via UBUS 3, XCVR 20-36, C bus 7, XCVR 20-16 and data signals SBDAT 0-7+ are written into data RAM 20-4; or the data signals DBUS 0-7 via U bus 3, XCVR 20-36, CBUS 7, XCVR 20-18 and data signals SBATT 0-7+ are written into attribute RAM 20-6 at the address location specified by address signals ABUS 9-19+.

During a DMA cycle, the CRTC 20 generates address signals CRTA 9-19+ and raster signals RASTR 1-4+. The address signals CRTA 9-19+ are applied to the data RAM 20-4 and the attribute RAM 20-6 via MUX 20-34 and address signals SBAD 9-19−. The data RAM 20-4 reads out data signals SBDAT 0-7+ representing the character to be displayed and stores it in register 20-12. The output signals COODE 0-7+ from register 20-12 are applied to the address terminals of the character generator RAM 20-2.

The signals COODE 0-7+ address the locations storing the dot matrix and the raster signals RAT 1-4+ applied to the address terminals of the character generator RAM 20-2, and address the locations of the portions of the character dot matrix to be displayed on the addressed 1 of 12 raster lines of the CRT display 20-10.

The character generator RAM 20-2 output signals VIDD 0-7+ are serialized by shift registers 20-28 and 20-30 and sent out on signal line VIDOUT+00 to the video support logic 20-8 for display on CRT 20-10 via NAND gate 20-36 signal VIDEO1−1C, exclusive OR gate 20-38 signal VIDEO2−00, register 20-40 and signal VIDEO3+00.

At the same time, the signal SBATT 0-7+ is read from the attribute RAM 20-6 to a number of registers (not shown) including a register 20-14 to perform the specified operation on the character read from data RAM 20-4. Attribute characters typically control blinking, high intensity display, inverse display, underlining, etc.

The CRTC 20 stores a DISPLAY+ signal in a storage position of register 20-22. The output signal DSPENA+OA is applied to another storage position of register 20-22. The output signal DSPENA+00 is applied to an AND gate 20-24. A signal BLNKLN- at logical ONE, indicating that the character line being displayed on the CRT 20-10 is not being blanked, is applied to the other input of AND gate 20-24. The display enable signal DSPENA+OB is applied to NAND gate 20-36. The signal VIDBLK− applied to NAND gate 20-36 at logical ONE indicates that the CRT 20-10 display screen is not being blanked. Signals DSPENA+OB and VIDBLK− at logical ONE condition NAND gate 20-36 to receive the data stream signal VIDOUT+00 as described supra.

The FDC 38 is conditioned to be operative under the control of the DXREDY signal from the PIA 52. In addition, signals D1MTON+ and D2MTON+ are applied to a driver 38-2. During normal operation, these signals turn the floppy disks 38-12 and 38-14 motors on via signals D1MTON− and D2MTON−. During the superpath operation, floppy disks 38-12 and 38-14 are made inoperative by disabling driver 38-2.

Also under normal operation, the FDC 38 generates signals DXUNTO+ and FDSKRW+ which are applied to a decoder 38-4. Signal DXUNT1+ is applied through a negative AND gate 38-6 to enable decoder 38-4 by signal DXENAB. Signal D1RWEN− selects floppy disk 1 and signal D2RWEN− selects floppy disk 2. Signal D1SKEN− when at logical ONE selects a seek mode and when at logical ZERO selects a read/write mode for floppy disk 1. Signal D2SKEN− in a similar manner selects the seek or read/write mode of floppy disk 2.

During the superpath operation, signal SPATHE+ applied to negative AND gate 38-6 disables decoder 38-4. Also during superpath operation, the firmware loads the data RAM 20-4 with consecutive bytes for addressing the character generator RAM 20-2 and loads the attribute RAM 20-6 with the data bytes for storage in the character generator RAM 20-2. The data bytes include hexadecimal 00 in address location hexadecimal 000, hexadecimal 08 in address location hexadecimal 010, hexadecimal 80 in address location hexadecimal 020, and hexadecimal 3C in the remaining address locations. Hexadecimal 3C shows up on the CRT 20-10 display as a box of all 48 dots or as a horizontal line if just one raster line per character is displayed. This tells the logic that an incorrect address was applied to the character generator RAM 20-2. The microinstructions stored in PROM 4-2 are executed by the microprocessor 4 and address the locations in RAM 4-6 storing the appropriate constants. These constants as described supra are stored in the attribute RAM 20-6 via MBUS 5, XCVR 4-4 and XCVR 20-18. Then under firmware control, the microprocessor transfers consecutive address signals to the data RAM 20-4 and the attribute RAM 20-6 via MUX 20-34. Address signals SBDAT 0-7+ are stored in register 20-12 and the data signals SBATT 0-7+ are stored in register 20-14. Signals VIDD 0-7+ are written at address locations specified by signals COODE 1-7+ and each of the selected raster signals RASTR 1-4+ from CRTC 20.

The data RAM 20-4 is then loaded with the floppy disk header information followed by the track and sector information as described supra. The data RAM 20-4 will store 8 bytes for each bit of information for simulating a 4.25 microsecond cell width. The 8 bytes will include hexadecimal 02 00 00 00 00 00 00 00 representative of a clock pulse, hexadecimal 00 00 00 00 02 00 00 00 representative of a data pulse, and hexadecimal 00 00 00 00 00 00 00 00 representative of a binary ZERO cell following a clock cell or a data cell.

After the test is concluded, the floppy disk header, track and sector information is written in the data RAM 20-4 at 7 bytes per bit to simulate a 3.72 microsecond cell width. The 7 bytes will include hexadecimal 02 00 00 00 00 00 00 for a clock cell, hexadecimal 00 00 00 00 01 00 00 00 for a data cell and hexadecimal 00 00 00 00 00 00 00 for a binary ZERO cell following a clock cell or a data cell.

Figure 3:
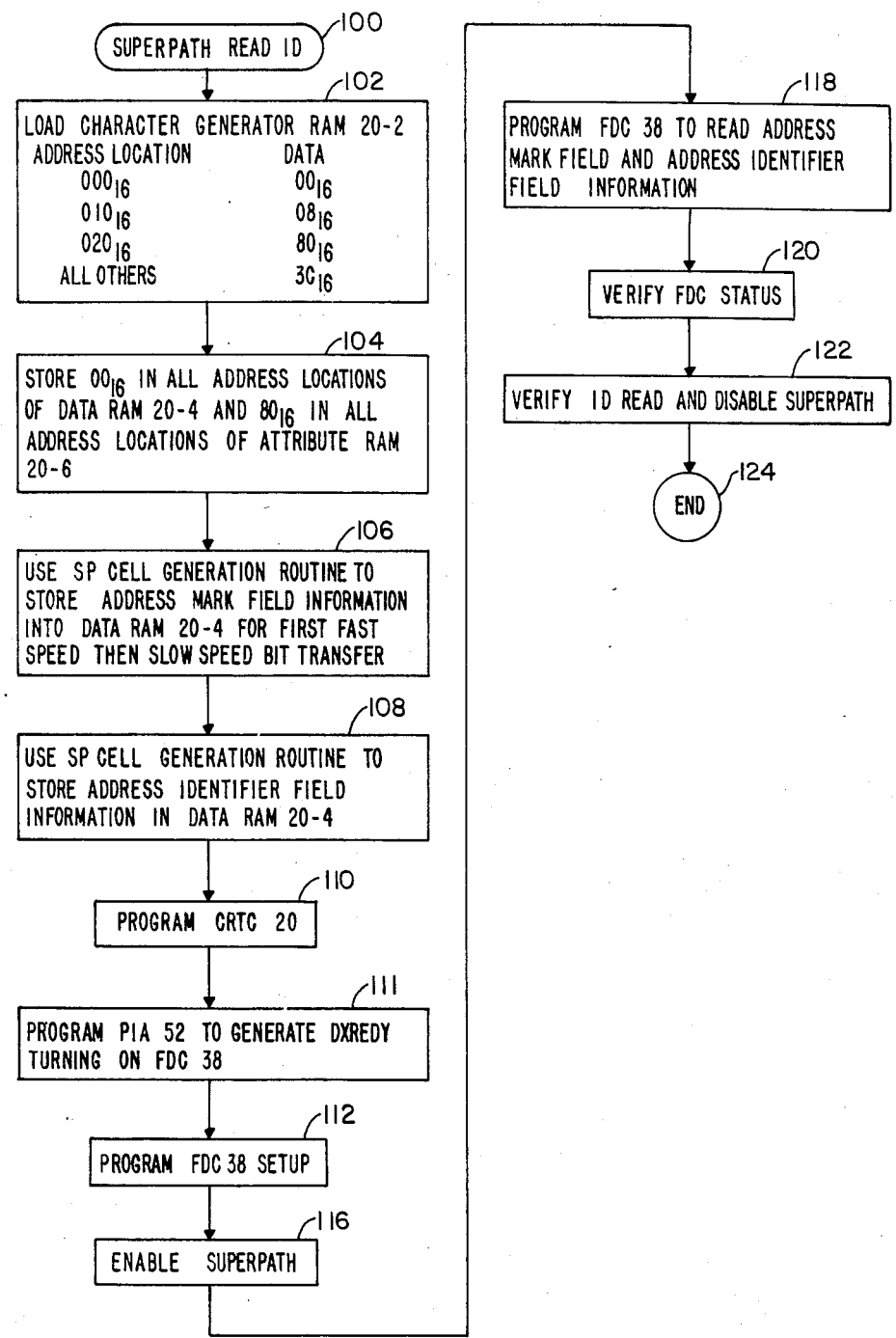
FIG. 3 is a flow diagram of the superpath read ID microprogram routine.

FIG. 3 shows a flow diagram of the superpath firmware for loading the character generator RAM 20-2 with the floppy disk address mark field and address identifier field information for transfer to the FDC 38 where it is verified.

Block 100 identifies the superpath read ID microprogram which loads the data RAM 20-4 with floppy disk address mark field and address identifier field information at 8 bytes per bit for transfer of 4.25 microsecond cells and then at 7 bytes per bit for transfer of 3.72 microsecond cells. The character generator RAM 20-2 is addressed by data RAM 20-4 bytes to read out bytes which are serialized and transferred to the FDC 38. The predetermined serial stream of bits may be considered as made up of clock pulse cells, data pulse cells and no pulse cells thereby simulating a stream of data read from a floppy disk diskette. The FDC 38 verifies the predetermined stream of bits.

Block 102 loads the character generator RAM 20-2 with hexadecimal 00 at address location hexadecimal 000, hexadecimal 08 at address location hexadecimal 010, hexadecimal 80 at address location hexadecimal 020, and hexadecimal 3C in the remaining address locations.

The data RAM 20-4 is loaded with consecutively numbered bytes in 16 sets of 128 (hexadecimal 00 through 7F) successive address locations. The attribute RAM 20-6 is loaded with hexadecimal 00 in address location hexadecimal 000, hexadecimal 08 in address location hexadecimal 010, hexadecimal 80 in address location hexadecimal 020 and hexadecimal 3C in the remaining address locations. The CRTC 20 is programmed to generate raster signals RASTR 1-4' starting from hexadecimal F and counting down to hexadecimal 0 for a corresponding one of the 16 sets of successive address locations of data RAM 20-4. Then under firmware control, the COODE 0-7+ signals from the data RAM 20-4 register 20-12 and CRTC 20 signals RASTR 1-4+ are applied to the address input terminals of the character generator RAM 20-2. This selects the address location into which is written the byte received from the attribute RAM 20-6 register 20-14 signals VIDD 0-7+ which is enabled by the signal CGENLD from PIA 52 thereby loading the character generator RAM 20-2.

Block 104 prepares the data RAM 20-4 to receive the floppy disk header, track and sector information by storing hexadecimal 00 in all address locations. Also, hexadecimal 80 is written into all address locations of the attribute RAM 20-6 since no attribute functions are desired during the superpath operation.

Figure 4:
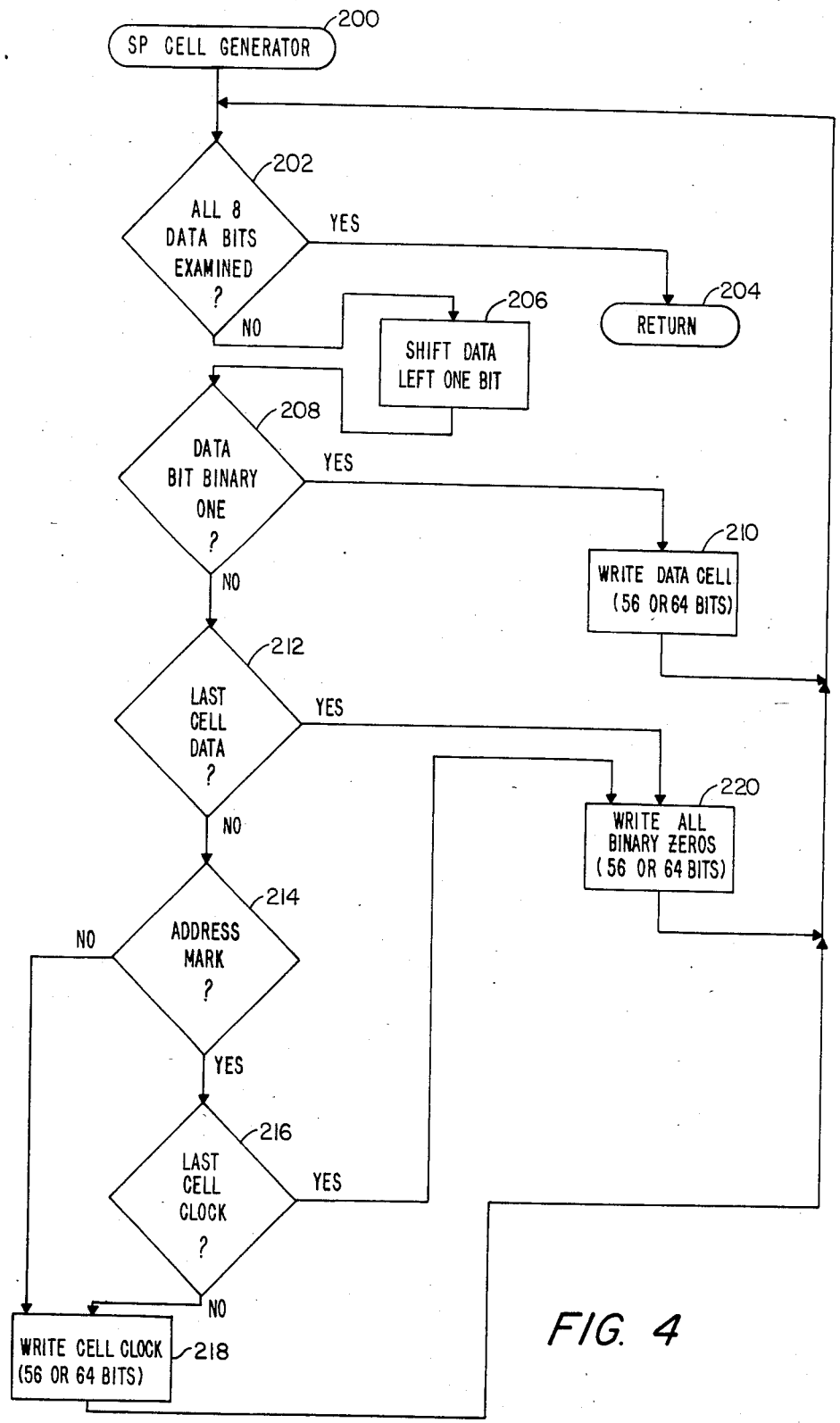
FIG. 4 is a flow diagram of the superpath cell generator microprogram routine.

Block 106 branches to the superpath cell generation routine of FIG. 4 to store the address mark field information into the data RAM 20-4. The address mark field information (a) through (c) is a fixed format as described supra.

Block 108 branches to the superpath cell generation routine of FIG. 3A to store the address identifier field information (d) through (i) are in a fixed format which is described supra.

The bytes in (a) through (i) supra are written into data RAM 20-4 first for the slow speed test. The firmware identifies the bits of each to be represented by a cell having a clock pulse, a data pulse or no pulse and writes a 64 bit code for each cell. A clock cell is written in 8 byte positions of data RAM 20-4 as hexadecimal 02 00 00 00 00 00 00 00 to read out hexadecimal 80 00 00 00 00 00 00 00 from character generator RAM 20-2 to FDC 38 over the superpath. A data pulse cell is written in data RAM 20-4 as hexadecimal 00 00 00 00 02 00 00 00 to be read out as hexadecimal 00 00 00 00 80 00 00 00 from the character generator RAM 20-2. A no pulse cell is written in data RAM 20-4 as hexadecimal 00 00 00 00 00 00 00 00. The 32 bytes of information in (a) through (i) supra take up 2048 byte positions of data RAM 20-4.

For the fast speed test, a 56 bit code is written in data RAM 20-4 for each cell. A clock cell is written in 7 byte positions of data RAM 20-4 as hexadecimal 02 00 00 00 00 00 00 to read out hexadecimal 80 00 00 00 00 00 00 from character generator RAM 20-2. A data cell is written in data RAM 20-4 as hexadecimal 00 00 00 01 00 00 00 to read out hexadecimal 00 00 00 08 00 00 00 from character generator RAM 20-2. The 32 bytes of information take up 1792 byte positions of data RAM 20-4.

Block 110 programs the CRTC 20 to scan a single raster line of each character row of the character generator RAM 20-6, 64 characters per row and 32 rows of characters for the slow speed operation. This stores 16,384 dot positions (32 rows×64 characters/row×8 dots/character). The 32 bytes require 16,384 dot positions to be read from the character generator RAM 20-2.

For the first speed operation, the 32 bytes require 14,336 dot positions (32 byte×8 bits/byte×56 dot positions/bit). The CRTC 20 is programmed to scan a single raster line of 56 characters per row and 32 rows of characters thereby storing 14,336 dot positions (32 rows×56 characters/row×8 dots/character). The output of each location, signals COODE 0-7+ and a selected raster line from signals RASTR 1-4+, is applied to character generator RAM 20-2. The output signals VIDD 0-7+ are serialized by shift registers 20-28 and 20-30 and are applied to the video. The AND gate 20-32 adds the ninth bit to the eight bits received from the character generator RAM 20-2.

Note that 8 dots/character are sent from the character generator RAM 20-2 to the shift registers 20-28 and 20-30 but 9 bits/character are sent out over signal line VIDOUT+ because of the REPEAT signal from AND gate 20-32.

Block 111 sets up to PIA 52 to generate the DXREDY signal and the DSKENB signal. The DSKENB signal enables the FDC 38 and the DXREDY signal indicates that the FDC 38 is ready to receive data from superpath. The PIA 52 controls the transfer of information between devices coupled to the data but 14 of FIG. 1. Note that data bus 14 includes the UBUS 3, the MBUS 5 and the CBUS 7 of FIG. 2.

Block 112 programs the FDC 38 internal timers via the FDC specify command by microprocessor 4 generating signal NEDISK− which is applied to the negative AND gates 52-2. The disk enable signal DSKENB− from PIA 52 is inverted by inverter 52-4. Signal DSKENB+ is gated through negative AND gate 52-2 by signal NEDISK− at logical ZERO to generate the floppy disk enable signal FDCENB− which is applied to FDC 38.

Block 116 enables superpath by generating signal SPATHE− via microprocessor 4, decoder 22-2 and register 22-4 as described supra. This enables the data path from the CRT subsystem to the floppy disk subsystem. Signal FDDTIN+ from tristate buffer 20-42 is applied to the data input terminal of FDC 38 as signal FDCRDD+ from phase lock loop logic 38-8.

Block 118 programs the FDC 38 to read the serial clock/data bit stream of superpath searching for header information. The header, track and sector bytes are stored in the data registers (not shown) of FDC 38 and the cyclic redundancy check characters are verified.

Block 120 verifies the FDC 38 status including the fact that the read ID command was completed and properly executed, the cyclic redundancy check characters were correct, no read errors were found, and the address mark was detected.

Block 122 verifies the head number, track and sector information received by the FDC 38. The microprocessor 4 reads the head number, track and sector information by data signals DBUS 0-7+ from FDC 38, XCVR 38-10, CBUS 7, XCVR 20-36, UBUS 3, and microprocessor 4 and compares it with the information stored in microprocessor RAM 4-6 that was sent originally.

Microprocessor 4 disables superpath by forcing the output of register 22-4, signal SPATHE−, to logical ONE.

The above steps 104 through 122 are repeated with high speed data.

FIG. 4 shows the superpath cell generator routine 200 which receives the header, track and sector data bytes and stores in data RAM 20-4 the codes representative of clock and data cells for each of the bits of the data byte. One bit of the data byte requires 64 bits to be stored in data RAM 20-4 for each cell of the slow speed test (4.25 microsecond cell) and 56 bits to be stored in data RAM 20-4 for each cell of the high speed test (3.72 microsecond cell).

The address mark field contains 15 bytes including 12 bytes of hexadecimal 00, 3 bytes of hexadecimal A1 (address mark) and 1 byte of hexadecimal FE (sector identification). The address identifier field contains 6 bytes including a track number, head select, sector number, sector size and 2 bytes of CRC.

Decision block 202 receives the byte and examines each bit to determine how it will be processed. Return block 204 calls for the next byte from block 106 or 108, FIG. 3, when all 8 bits of the data byte were processed.

Block 206 shifts the data byte left 1 bit position. Upon the initial call from block 106, the data byte will be 00.

Decision block 208 examines the leftmost bit which in this case is a binary ZERO and branches to decision block 212. Since the last cell was not a data cell, the firmware branches to block 214 which tests from address mark. Since this is not an address mark, the firmware branches to block 218.

Block 218 writes a clock cell in data RAM 20-4. For the slow speed operation, hexadecimal 02 00 00 00 00 00 00 00 is written in the first 8 address locations. For the high speed operation, hexadecimal 02 00 00 00 00 00 00 is written in the first 7 address locations.

After all 8 bits of the first data byte are examined in decision block 202, the firmware branches to the return block 204 to fetch the next byte. The above sequence is repeated for the first 12 bytes of hexadecimal 00 filling 768 consecutive address locations of data RAM 20-4 with 12 clock cells for the slow speed operation or filling 672 consecutive address locations for the high speed operation.

The thirteenth byte is an address mark hexadecimal A1 (binary 1010 0001) and is received by decision block 202. Block 206 shifts the address mark byte left one bit position. Decision block 208 branches to block 210 to generate a data cell, hexadecimal 00 00 00 00 02 00 00 00 for the slow speed operation and hexadecimal 00 00 00 01 00 00 00 for the high speed operation.

Block 210 branches to decision block 202 which in turn branches to block 206 to shift left one bit position. Decision block 208 examines the binary ZERO in the second bit position of the address mark and branches to decision block 212. Bit positions are defined as the high order bit of a byte being bit position 1 and the low order bit of the byte as being bit position 8.

In decision block 212, if the last cell was a data cell as is the case, then the firmware branches to block 220 when a no pulse cell, hexadecimal 00 00 00 00 00 00 00 00 or 00 00 00 00 00 00 00 is written.

The above address mark sequence is repeated for the third and fourth bit positions, binary ONE and binary ZERO respectively.

The address mark binary ZERO in the fifth bit position is shifted one bit position left in block 206, and examined in decision block 208 which branches to decision block 212. The last cell was not a data cell so the firmware branches to decision block 214. This is an address mark so the firmware branches to block 216.

The last cell was not a clock cell so the firmware branches to block 218 where a clock cell is written as described supra.

The address mark binary ZERO in the sixth position is processed through decision block 202, block 206, decision block 208, decision block 212, decision block 214 and decision block 216. Since the last cell was a clock cell, then the firmware branches to block 220 which writes the no pulse cell. This represents the "missing clock" of the address mark.

The binary ZERO bit of bit position 7 of the address mark is processed through decision block 202, block 206, decision blocks 208, 212, 214 and 216. Since the last cell was not a clock cell, then decision block 216 branches to block 218 which writes the clock cell.

The binary ONE bit of bit position 8 of the address mark is processed through decision block 202, block 206, decision block 208, and block 210 which writes a data cell. Block 202 now branches to return 204 which calls for the next address mark from block 106, FIG. 3. The next address mark and the third address mark are processed by routine 200 as described supra.

The sector identification byte hexadecimal FE (binary 1111 1110) is processed through decision block 202, block 206, decision block 208 and block 210 for bit positions 1 through bit positions 7. The binary ZERO is bit position 8 is processed through decision block 202, block 206, decision block 208, decision block 212 and block 220 which writes a no pulse cell.

The firmware now processes block 108 which calls for the superpath cell generation routine 200 to generate data cell, clock cell and no pulse cell values for storage in data RAM 20-2. The track ID hexadecimal 00, the head select hexadecimal 00, the sector number hexadecimal 07 (binary 0000 0111), the sector size hexadecimal 01, the 2 bytes of cyclic redundancy check hexadecimal 50AA (binary 0101 0000 1010 1010) and the 10 bytes of gap fillers hexadecimal 4E (binary 0100 1110) are processed as described supra.

Figure 5:
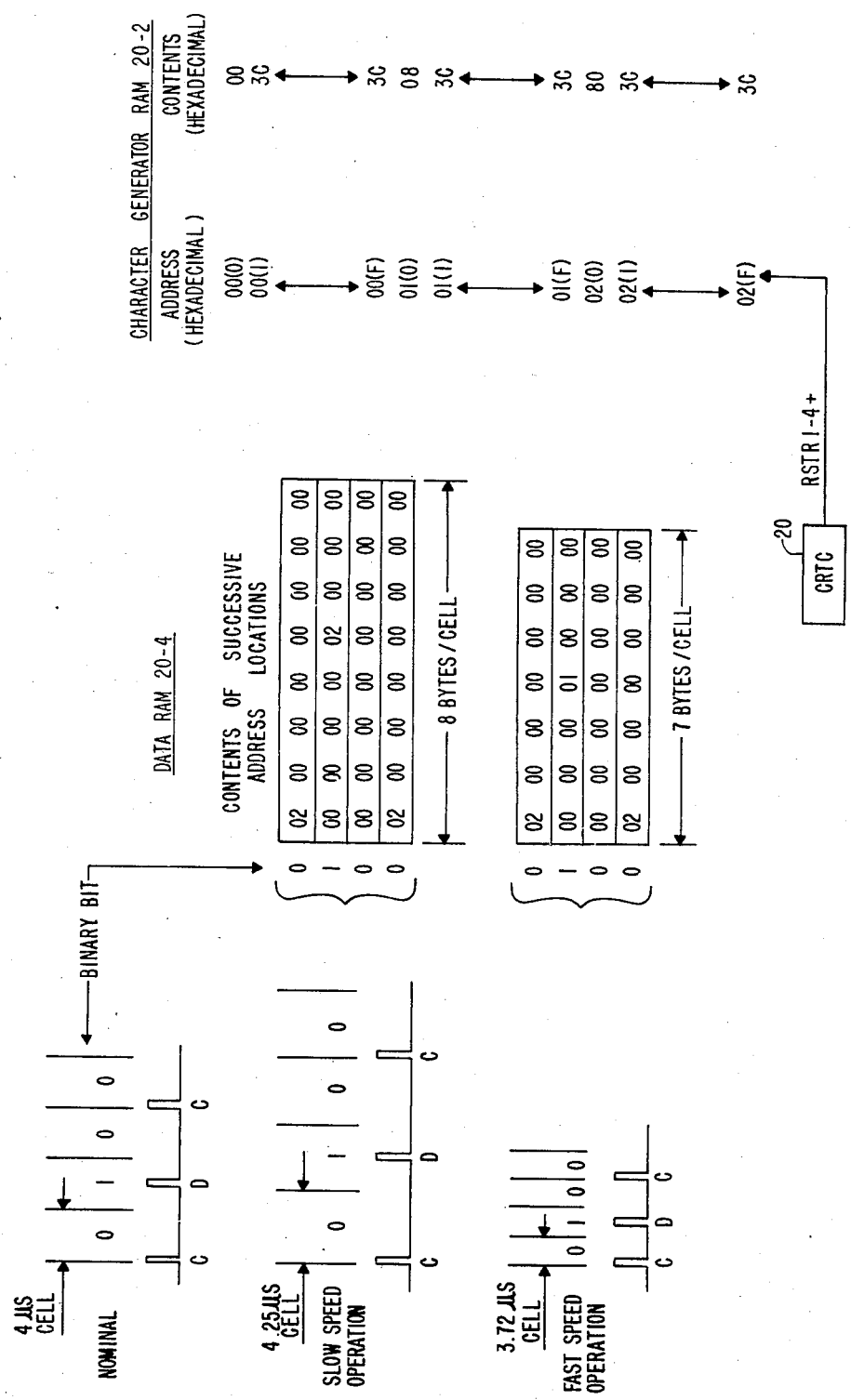
FIG. 5 is a diagram showing the fast and slow speed operations cell generation.

FIG. 5 is a chart of a sample four bit position binary number 0100. The nominal 4 microsecond cell per bit shows a clock cell, a data cell, a no pulse cell and a clock cell representative of each of the four binary bits respectively. This is compared with the slow speed 4.25 microsecond cells and the fast speed 3.72 microsecond cells.

The contents of eight successive address locations of data RAM 20-4 for each bit for the slow speed operation and the contents of seven successive addresses for each bit for the fast speed operation are shown.

The contents of the data RAM 20-4 locations, as well as the raster signals RSTR 1-4+ (the hexadecimal value in parenthesis) from CRTC 20, are used to address the character generator RAM 20-2. Note that the superpath values are stored in address locations hexadecimal 000, 010 and 020. The remaining address locations store hexadecimal 3C.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system including apparatus for verifying the integrity of the system, said apparatus comprising:

a video display;

video control means including video memory for storing data bytes to be displayed, means for generating a serial stream of data bits in a display format representative of the data bytes, and means for directing the generated serial stream of data bits to the video display for display;

disk storage means;

disk control means for receiving a serial stream of data bits in a disk format from the disk storage means;

buffer means for directing the serial bit stream from the video control means to the disk control means in a test mode and for isolating the video control means and disk control means in an operating mode; and microprocessor means for storing, in the video memory, data bytes for generating in the video control means a serial stream of data bits in the disk format, for placing the buffer means in the test mode and for verifying data received from the disk control means responsive to the thus generated serial stream of data bits.

2. A data processing system as claimed in claim 1 wherein the serial stream of data bits in the disk format comprises a sequence of cells, each cell representative of a binary one or binary zero, each cell having a data bit, a clock bit, or neither a data bit nor a clock bit, each cell having a time duration greater than the time duration of a data bit in the display format.

3. A data processing system as claimed in claim 2 wherein the means for generating a serial stream of data bits in the video control means comprises a character generator RAM addressed by data bytes from the video memory.

4. A data processing system as claimed in claim 3 wherein the microprocessor means includes means for programming the character generator RAM prior to placing the buffer means in the test mode.

5. A data processing system as claimed in claim 3 further comprising decoder means responsive to instructions applied to the microprocessor means for placing the buffer means in the test mode.

* * * * *

UNITED STATES PATENT AND TRADEMARK OFFICE
CERTIFICATE OF CORRECTION

PATENT NO. : 4,667,329

DATED : May 19, 1987

INVENTOR(S) : Thomas L. Murray, Jr.; James C. Siwik and Thomas O Holtey

It is certified that error appears in the above-identified patent and that said Letters Patent are hereby corrected as shown below:

Title page, after "Assistant Examiner--Jonathan C. Fairbanks: insert -- Attorney, Agent or Firm--George Grayson; John S. Solakian --.

Signed and Sealed this

Twenty-second Day of September, 1987

*Attest:*

DONALD J. QUIGG

*Attesting Officer*   *Commissioner of Patents and Trademarks*